United States Patent
Arslan et al.

(10) Patent No.: US 10,992,452 B2
(45) Date of Patent: Apr. 27, 2021

(54) SYSTEM AND METHOD OF ADAPTIVE CORRELATION THRESHOLD FOR BANDLIMITED SIGNALS

(71) Applicant: Silicon Laboratories Inc., Austin, TX (US)

(72) Inventors: Guner Arslan, Austin, TX (US); Amey Naik, Austin, TX (US); Yan Zhou, Spicewood, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 16/367,962

(22) Filed: Mar. 28, 2019

(65) Prior Publication Data

US 2020/0313844 A1 Oct. 1, 2020

(51) Int. Cl.
*H04L 7/04* (2006.01)
*H04B 1/10* (2006.01)
*H04L 25/06* (2006.01)

(52) U.S. Cl.
CPC ........... *H04L 7/042* (2013.01); *H04B 1/1027* (2013.01); *H04L 25/067* (2013.01)

(58) Field of Classification Search
CPC ....... H04L 7/042; H04L 25/067; H04L 43/16; H04B 1/1027; H04B 1/709
See application file for complete search history.

(56) References Cited

U.S. PATENT DOCUMENTS

| | | | | |
|---|---|---|---|---|
| 5,073,906 A * | 12/1991 | Otani | ...... | H04L 7/042 375/368 |
| 2003/0179813 A1* | 9/2003 | Morita | ...... | H04B 1/7085 375/148 |
| 2004/0218699 A1* | 11/2004 | Carsello | ...... | H04L 7/042 375/343 |
| 2011/0035522 A1* | 2/2011 | Tan | ...... | G06F 13/28 710/107 |
| 2012/0195401 A1* | 8/2012 | Becker | ...... | H04L 7/042 375/368 |
| 2016/0344459 A1* | 11/2016 | Chen | ...... | H04B 7/0854 |
| 2016/0373279 A1* | 12/2016 | Lopez | ...... | H04L 5/0053 |
| 2018/0248681 A1* | 8/2018 | Seely | ...... | H04L 7/042 |

FOREIGN PATENT DOCUMENTS

EP    0431957 A2 *  6/1991  ............. H04L 7/042

* cited by examiner

*Primary Examiner* — Aristocratis Fotakis
(74) *Attorney, Agent, or Firm* — Gary Stanford (57) ABSTRACT

A wireless receiver including a front end circuit, an adaptive threshold circuit, and a correlator. The front end circuit converts a wireless signal into a series of digital symbols. The adaptive threshold circuit provides an adaptive correlation threshold that is adapted based on a sync word. The correlator correlates the digital symbols with the sync word using the adaptive correlation threshold. The adaptive correlation threshold may be based on amplitude attenuation of the digital symbols that correspond to transitions of the sync word. The adaptive threshold circuit may be a lookup table that stores different threshold values each corresponding to one of multiple different sync words. Alternatively, the adaptive threshold circuit may be implemented as an evaluation circuit that determines the adaptive correlation threshold based on expected amplitude attenuation of the digital symbols that correspond to transitions of the sync word.

20 Claims, 6 Drawing Sheets

SYSTEM AND METHOD OF ADAPTIVE CORRELATION THRESHOLD FOR BANDLIMITED SIGNALS

BACKGROUND OF THE INVENTION

Field of the Invention

The present invention relates in general to wireless communications, and more particularly to the process of correlating the synchronization word contained within a received bandlimited signal with a known synchronization word and an adaptive correlation threshold.

Description of the Related Art

The Internet of Things (IoT) is a network of physical devices or other items embedded with electronics, software, sensors, actuators, etc., which enables the devices to interface each other and to exchange information. A home automation system, for example, may be used to control devices and functions in a home or the like, such as lighting, HVAC (climate control), entertainment systems, appliances, home security devices (including access control and alarm systems and the like), etc. It is understood, of course, that IoT encompasses much more than home automation and residential applications and may be used for various commercial applications. IoT may be implemented using any one of many different wireless technologies, such as ZigBee, Thread, Z-wave, etc.

The wireless technologies typically used for IoT applications and the like encapsulate information within a narrow frequency band within a radio frequency (RF) wireless signal. The RF wireless signal may be transmitted, for example, in a 2.4 Gigahertz (GHz) range, and then down converted by the wireless receiver to an intermediate frequency (IF) range, such as about 1 to 2 Megahertz (MHz). The RF signal range may extend from 2.4 GHz to about 2.485 GHz with multiple narrow channels distributed therein. Bluetooth Low Energy (Bluetooth LE or BLE), for example, includes 40 channels each having a narrow bandwidth of about 2 MHz. Zigbee includes 16 channels within the same broad frequency range, each channel about 2 MHz.

Bandpass filters are used by the transmitter to isolate the individual channels, and similar channel filters are used by the receiver to filter out undesired noise and to maximize signal-to-noise ratio (SNR). Bandpass and channel filters, however, also have a deleterious impact on the signal within the desired channel. The filtering removes the higher frequency content which slows signal transitions and reduces peak amplitude swings. Such filtering has a negative impact on the process of correlation.

SUMMARY OF THE INVENTION

A wireless receiver according to one embodiment includes a front end circuit, an adaptive threshold circuit, and a correlator. The front end circuit converts a wireless signal into a series of digital symbols. The adaptive threshold circuit provides an adaptive correlation threshold that is adapted based on a sync word. The correlator correlates the digital symbols with the sync word using the adaptive correlation threshold. The adaptive correlation threshold may be based on amplitude attenuation of the digital symbols that correspond to transitions of the sync word.

The adaptive threshold circuit may be a lookup table that stores different threshold values each corresponding to one of multiple different sync words. The sync word is used to select one of the threshold values as the adaptive correlation threshold. The sync word may be used, for example, as an index to the lookup table for accessing the corresponding threshold value. Alternatively, the adaptive threshold circuit may be implemented as an evaluation circuit that determines the adaptive correlation threshold based on expected amplitude attenuation of the digital symbols that correspond to transitions of the sync word.

The sync word may include a set of N digital values, in which the correlator includes a multiplier, an adder, and a comparator. The multiplier multiplies each digital symbol of each group of N sequential symbols of the digital symbols with a corresponding one of N digital values of the sync word to provide sets of N correlated symbols. The adder sums the N correlated symbols of each group together to provide a corresponding one of multiple correlation values. The comparator compares each correlation value with the adaptive correlation threshold. Each group of N sequential symbols may be determined beginning with each digital symbol and the following N−1 sequential digital symbols according to a sliding window function.

The wireless receiver may further include a memory that stores the digital symbols in sequential manner, such that when at least one correlation value reaches the adaptive correlation threshold, the correlator provides location information to locates at least one of the digital symbols stored in the memory.

A method of adaptive correlation according to one embodiment includes converting a wireless signal into digital symbols, determining an adaptive correlation threshold based on a predetermined sync word, and correlating the digital symbols with the sync word using the adaptive correlation threshold. The method may include determining the adaptive correlation threshold based on amplitude attenuation of the digital symbols that correspond to transitions of the sync word.

The method may include applying the sync word to a lookup table that stores different threshold values each corresponding to one of multiple different sync words, and receiving from the lookup table a corresponding threshold value as the adaptive correlation threshold. Alternatively, the method may include determining expected amplitude attenuation of digital symbols based on transitions of the sync word and providing attenuated amplitudes, summing the attenuated amplitudes to determine a maximum adjusted correlation value, and calculating the adaptive correlation threshold by multiplying the maximum adjusted correlation value by a correction factor.

The sync word may include N digital values, in which the method may further include multiplying each symbol of each group of N sequential symbols of the digital symbols with a corresponding one of the N digital values of the sync word to provide multiple sets of N correlated symbols, summing the N correlated symbols of each group together to provide a corresponding one of multiple correlation values, and comparing each correlation value with the adaptive correlation threshold. The method may include determining each group of N sequential symbols to begin with each digital symbol and to include the following N−1 sequential digital symbols according to a sliding window function.

The method may include storing the digital symbols in sequential manner, and when at least one of the correlation values reaches the adaptive correlation threshold, providing location information that locates at least one of the stored digital symbols.

A correlation system according to one embodiment may include a memory that stores a sync word, an adaptive threshold circuit that receives the sync word that that provides a corresponding adaptive correlation threshold that is adapted based on the sync word, and a correlator that correlates digital symbols converted from a bandlimited signal with the sync word using the adaptive correlation threshold.

BRIEF DESCRIPTION OF THE DRAWINGS

The present invention is illustrated by way of example and is not limited by the accompanying figures in which like references indicate similar elements. Elements in the figures are illustrated for simplicity and clarity and have not necessarily been drawn to scale.

DETAILED DESCRIPTION

The inventors have recognized the negative impact of band pass and channel filtering on the correlation process. They have therefore developed a system and method of providing an adapted correlation threshold based on the synchronization (SYNC) word to achieve a more efficient correlation process. The correlation threshold is tailored, for example, based on the number or frequency of transitions of the SYNC word to account for amplitude attenuation caused by the filtering process. The number of transitions causing corresponding transition patterns reduces the amplitudes of the filtered signal and corresponding digital samples. The amount of amplitude attenuation from one digital symbol to the next during the SYNC word may be predetermined or may otherwise be calculated and used to determine the adapted correlation threshold. The adapted correlation threshold provides a more accurate distinction between true and false peak detection during the correlation process.

Figure 1:
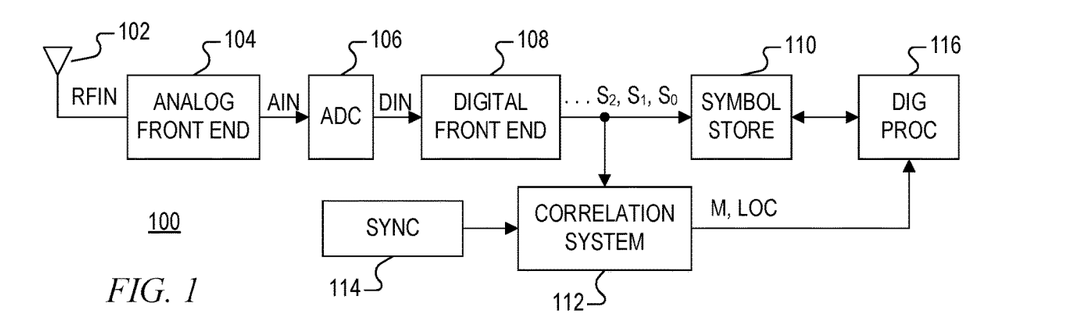
FIG. 1 is a simplified block diagram of a wireless receiver incorporating a correlation system implemented according to one embodiment of the present invention which adapts a correlation threshold based on the synchronization word.

FIG. 1 is a simplified block diagram of a wireless receiver 100 incorporating a correlation system 112 implemented according to one embodiment of the present invention which adapts a correlation threshold based on a previously determined or received SYNC word. An antenna 102 (and other supporting circuitry, not shown) detects and converts a transmitted wireless signal into a received radio frequency (RF) input signal (RFIN). The RFIN signal is provided to the input of an analog front end 104, which incorporates amplifiers, filters, mixers, oscillators, etc. (not shown), for converting the received RFIN signal into an intermediate frequency (IF) analog input (AIN) signal. AIN is sampled and converted by an analog-to-digital converter (ADC) 106 to a digital input (DIN) signal, which is provided to the input of a digital front end 108.

The digital front end 108 includes decimators, mixers, filters, demodulators, at least one COordinate Rotation Digital Computer (CORDIC), etc. (not shown), for converting the DIN signal into a series of digital symbols, $S_0$, $S_1$, $S_2$, ... ($S_j$), in which "j" is an integer index beginning at 0 for the first symbol up to the total number of symbols of the received signal. Generally speaking, the ADC 106 samples AIN at a relatively high frequency, and the digital front end 108 converts the signal to baseband, decimates the digital samples to an oversampled rate that is an integer multiple of the desired baud rate, detects the phase and timing of the received signal, and selects or otherwise determines digital samples based on phase and timing to provide the digital symbols $S_j$. The digital symbols $S_j$ represent the bits that collectively form the wireless packet that was received by the wireless receiver 100.

The digital symbols $S_j$ are stored in a symbol store memory 110 and further provided to the correlation system 112. It is noted that the correlation system 112 may either receive the digital symbols $S_j$ directly as shown, or alternatively may retrieve them from the symbol store memory 110 in different embodiments. A SYNC memory 114 stores the SYNC word that defines a unique pattern or address or the like that is provided to the correlation system 112. The SYNC word is used by the correlation system 112 to determine whether a packet contained within the received RFIN signal is intended for the wireless receiver 100. The digital symbols $S_j$ include a set of "bits" or digital values that collectively define the packet contained within the RFIN signal, in which the packet may include a SYNC word also having a unique pattern or address or the like. As described further herein, the correlation system 112 performs pattern recognition by searching the digital symbols $S_j$ for a pattern that matches the pattern of the SYNC word stored in the SYNC memory 114.

If and when the SYNC word pattern within the sequential string of digital symbols $S_j$ sufficiently matches the pattern defined by the SYNC word, the correlation system 112 detects a match and provides a match indication "M" to indicate that the wireless signal is intended for the wireless receiver 100, and also provides location LOC information or the like. The match indication M and the LOC information is provided to digital processing circuitry 116, which then accesses the symbol store memory 110 to retrieve and process the payload information from the sequential string of digital symbols $S_j$. When a match is not detected, the received signal is either ignored or otherwise discarded.

Figure 2:
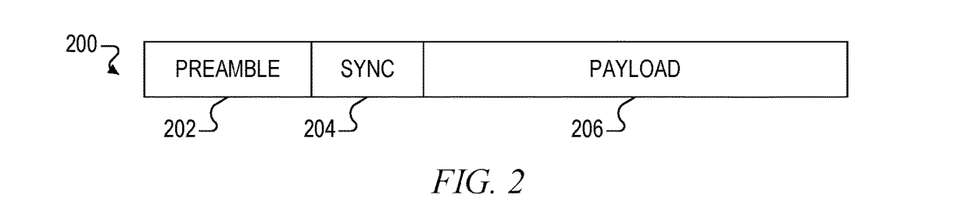
FIG. 2 is a simplified representation of the organization of a packet contained within the radio frequency signal received by the wireless receiver of FIG. 1.

FIG. 2 is a simplified representation of the organization of a packet 200 contained within the RFIN signal received by the wireless receiver 100. The packet 200 may at least include a preamble 202, a SYNC word 204, and a payload 206. It is understood that the packet 200 may also contain additional information which is not shown since not necessary for a complete understanding of the present disclosure. The wireless receiver 100 uses the preamble 202 to detect the relative strength of the received signal in order to adjust the gain of the analog front end 104. Although not further described, the analog front end 104 incorporates automatic gain control (AGC) for adjusting the strength of the AIN signal to within a desired amplitude range of the ADC 106. The preamble 202 may also include a known pattern, such as alternating 1's and 0's or the like, that enables the digital front end 108 to determine timing and phase information of the signal being received. Such timing information may be used, for example, to select those samples of the oversampled received signal that most accurately reflect the information incorporated within packet, in which the selected samples are used as the sequential string or series of digital symbols $S_j$. Alternatively, the digital samples may be processed or otherwise converted into the digital symbols $S_j$.

As the wireless signal is being received, even if the timing between symbols may be estimated from the preamble 202, the location of the SYNC word 204 in the packet 200 is not initially known. Thus, the correlation system 112 begins the correlation process as soon as possible during the preamble 202, and the correlation process is continually performed until a match is detected or the signal terminates. If the pattern of the SYNC word 204 contained within the packet 200 matches the pattern defined by the SYNC word stored in the SYNC memory 114, then the correlation system 112 detects and indicates the match M and provides the LOC information to the digital processing circuitry 116. If a match is not detected, then the received signal is simply discarded or otherwise ignored.

Figure 3:
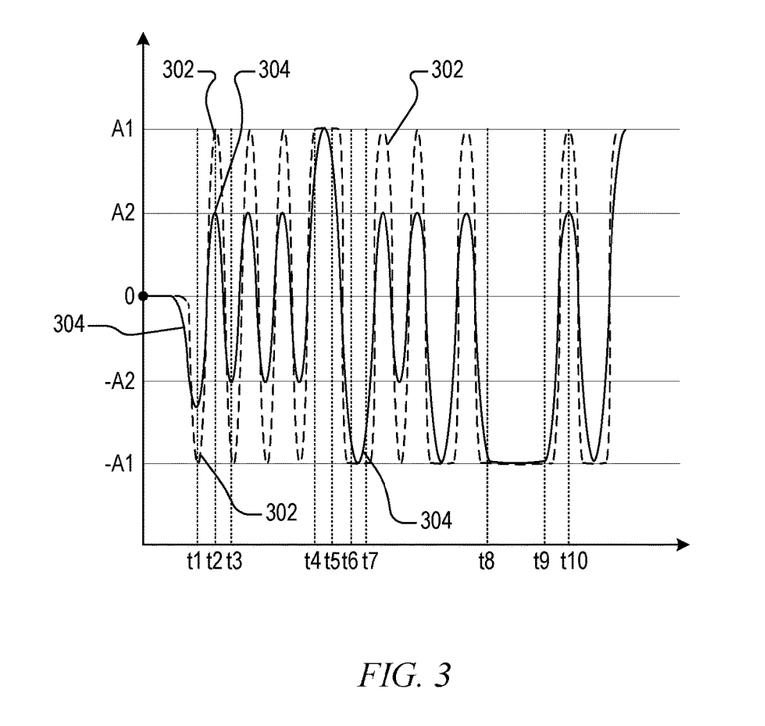
FIG. 3 is a graphic diagram plotting both an unfiltered signal and a filtered signal versus time in which both signals are noiseless and intended to reflect the same information.

FIG. 3 is a graphic diagram plotting both an unfiltered signal 302 and a filtered signal 304 versus time in which both signals are intended to reflect the same information. Both signals are shown in idealized format without noise. Noise, for example, may cause distortions of the signal and variations of the signal amplitude. The unfiltered signal 302 is shown transitioning between a positive peak value A1 and a negative peak value −A1. It is noted that the actual value of A1 may vary depending upon the strength of the wireless signal and the settings of the AGC, among other variables. Also, the peak of each transition may vary for an actual signal because of noise and other factors.

The unfiltered signal 302 starts at zero and transitions to −A1 at a time t1, then transitions up to A1 at a time t2, then transitions back to −A1 at a time t3, and the pattern repeats for a few more cycles. When viewed from a binary standpoint, the initial pattern is −1, 1, −1, 1, . . . , which alternates between −1 and 1. At subsequent time t4, the unfiltered signal 302 transitions to A1 and stays at A1 for the next cycle at time t5, then transitions back to −A1 at time t6 and stays at −A1 for the next cycle at time t7, representing a corresponding pattern 1, 1, −1, −1 between times t4 and t7. At subsequent time t8, the unfiltered signal 302 transitions to −A1 and stays at −A1 for the next four cycles to a time t9 representing the pattern −1, −1, −1, −1, −1, before going back to A1 in the next cycle at time t10. The unfiltered signal 302 continues to transition in similar manner to represent a corresponding pattern of binary values.

The filtered signal 304 is intended to follow the same pattern as the unfiltered signal 302. The filtered signal 304, however, does not always transition to the full peak value A1 or −A1 because of bandpass and channel filtering. The filtering process removes high frequency content so that the signal transitions of the filtered signal are slowed. The slower response prevents the filtered signal from reaching the maximum peak values A1 or −A1 for fast transitions thus attenuating the amplitudes of the filtered signal. At time t1, for example, the filtered signal 304 falls below a smaller negative amplitude −A2 but does not transition all the way down to −A1. At time t2 when the unfiltered signal 302 transitions up to A1, the filtered signal 304 only reaches a smaller positive amplitude A2 since the signal is already transitioning back negative. The magnitude of A2, which may be about the same as the magnitude of −A2, may only be about half the magnitude of A1 and −A1. As the unfiltered signal 302 toggles between A1 and −A1, the filtered signal only transitions between A2 and −A2 during faster transitions.

When the unfiltered signal 302 does not transition for at least 2 consecutive cycles, such as shown at times t4 and t5, then the filtered signal 304 may have time to reach A1 as shown between times t4 and t5. It is noted, however, that if the filtered signal 304 were sampled almost exactly at time t4, then the sample value is between A2 and A1 since the filtered signal has not yet reached A1. Also, if the filtered signal 304 were sampled almost exactly at time t5 when it is already transitioning back down and again, the sample value is again less than A1 even if greater than A2. Thus, rather than actually reaching A1 for two cycles as with the unfiltered signal 302, the samples of the filtered signal 304 are less than A1. When the unfiltered signal 302 does not transition for multiple cycles, such as shown between times t8 and t9 when it stays at −A1 for several cycles, then the filtered signal 304 eventually reaches −A1 and may be sampled for 2 or 3 times at the full negative peak value of −A1.

In summary, whereas the unfiltered signal 302 fully transitions between the maximum peak values of A1 and −A1, the filtered signal 304 is attenuated during faster transitions and instead peaks at one or more attenuated intermediate levels depending upon the binary pattern. Thus, whereas the unfiltered signal effectively has 2 amplitude values A1 and −A1, the filtered signal has multiple amplitude values including A1, −A1, A2, −A2, along with one or more levels between A2 and A1 or −A2 and −A1. The filtered signal may achieve the maximum amplitude A1 only in the absence of transitions for three or more cycles, but otherwise peaks at intermediate levels at magnitudes less than A1. When the unfiltered signal 302 toggles between values in consecutive cycles, the filtered signal 304 also transitions but only between significantly smaller peak levels A2 and −A2 having a magnitude of A2, in which A2 is significantly smaller and may even be only half the magnitude of A1. Even when the unfiltered signal 302 stays at a peak value for two cycles, the filtered signal 304 may be sampled above A2 but less than the full peak magnitude A1. The digital samples developed in the digital front end 108, even when oversampled, are correspondingly attenuated.

Figure 4:
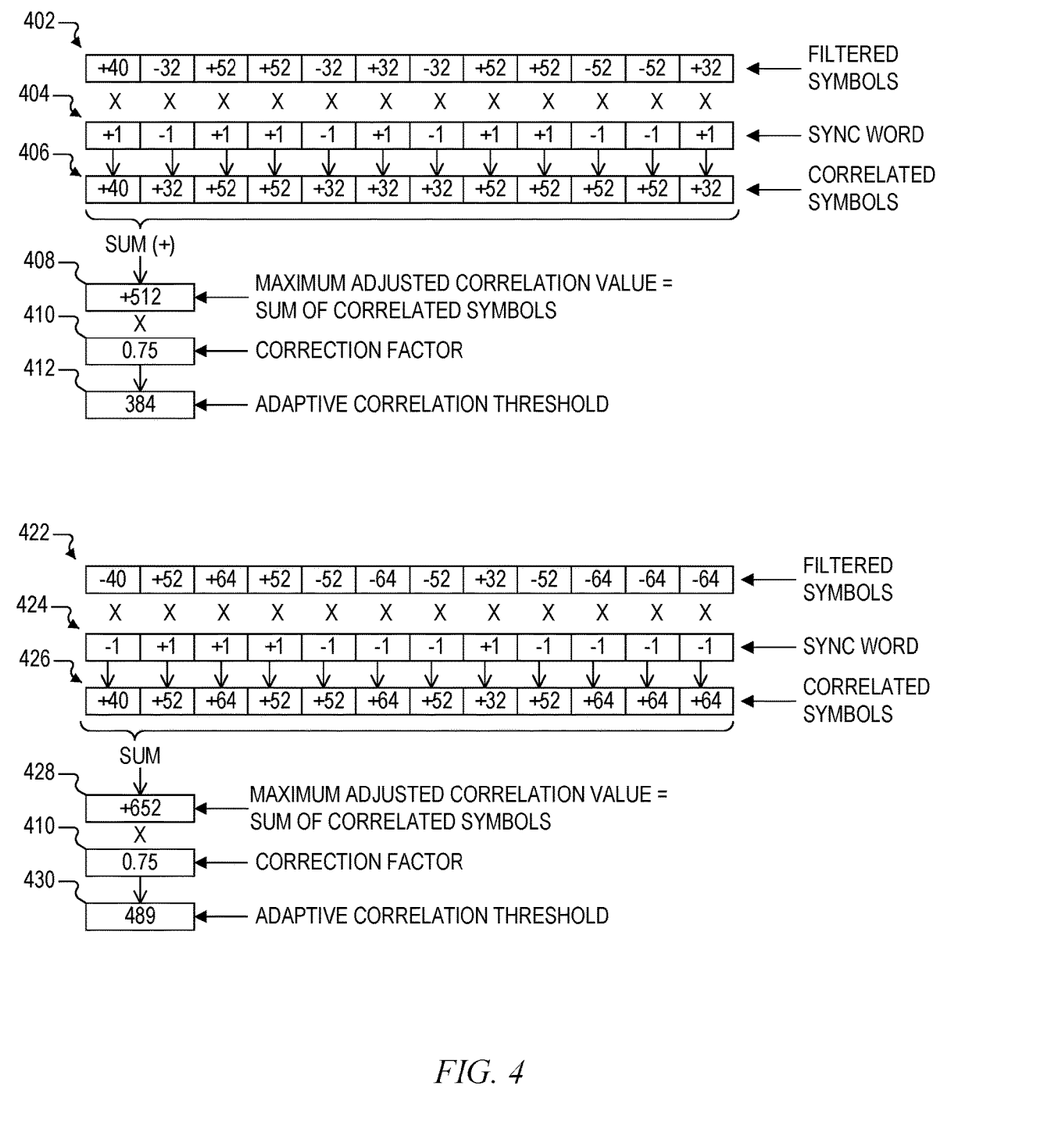
FIG. 4 is a figurative diagram illustrating the correlation process of sets of filtered symbols with attenuated amplitudes and determination of corresponding adaptive correlation thresholds.

FIG. 4 is a figurative diagram illustrating the correlation process of sets of filtered symbols with attenuated amplitudes and determination of corresponding adaptive correlation thresholds. A target maximum amplitude of A1=64 is assumed such that corresponding unfiltered symbols transition between +64 and −64 in a similar manner shown in FIG. 3. The amplitude of 64 may be based on the desired resolution of the symbols in a given configuration, where it is understood that different amplitudes may be selected. The symbols are in idealized format without noise and assumed to be sampled at peak values to provided idealized digital symbols.

A first set of 12 filtered symbols 402 is shown along with a corresponding SYNC word 404, in which it is understood that a typical SYNC word may include more symbols, such as, for example, up to 32 symbols or more. The SYNC word 404 illustrates the SYNC pattern +1, −1, +1, +1, −1, +1, −1, +1, +1, −1, −1, +1 in which a correlation match occurs when the digital symbols follow the same pattern. A set of unfiltered symbols without noise and perfectly sampled would follow the same pattern with an amplitude of 64 as follows: +64, −64, +64, +64, −64, +64, −64, +64, +64, −64, −64, +64. As illustrated in FIG. 3, however, the filtered signal is attenuated so that the corresponding filtered symbols have attenuated amplitudes. The set of filtered symbols 402 have the same pattern as the SYNC word 404 but have attenuated amplitudes as follows: +40, −32, +52, +52, −32, +32, −32, +52, +52, −52, −52, +32.

A set of correlated symbols 406 is shown, each determined by multiplying (represented with symbol "X") a corresponding filtered symbol from the set of filtered symbols 402 with a corresponding SYNC value from the SYNC word 404. Thus, the first filtered symbol +40 is multiplied by the first SYNC value +1 to provide a first correlated symbol +40, the second filtered symbol −32 is multiplied by the second SYNC value −1 to provide a second correlated symbol +32, and so on for all 12 values. It is appreciated that the positive/negative pattern of the set of filtered symbols 402 is exactly the same as the SYNC word 404, so that both sets of values are perfectly correlated with each other. In this manner, the set of correlated symbols 406 are all positive values.

A maximum adjusted correlation value 408 is determined as the sum of the set of correlated symbols 406 having a sum value of +512. This is in contrast to a correlation value of 12*64=+768 for a corresponding set of 12 unfiltered symbols (each having an amplitude of 64). Because of noise and variances in gain of the analog front end 104, the amplitude of the signal varies causing a corresponding variation of the symbol amplitudes so that 100% correlation does not occur. Instead, the maximum adjusted correlation value 408 is multiplied by a correction factor 410 to determine an adaptive correlation threshold 412. In the illustrated configuration, the correction factor 410 is selected as 75% or 0.75 resulting in an adaptive correlation threshold 412 value of 384. The adaptive correlation threshold 412 is based on amplitude attenuation of the filtered symbols caused by the particular transitions of the SYNC word 404.

Another set of 12 filtered symbols 422 is shown along with a corresponding SYNC word 424 having a different SYNC pattern −1, +1, +1, +1, −1, −1, −1, +1, −1, −1, −1, −1. The set of filtered symbols 422 have the same pattern as the SYNC word 424 but have attenuated amplitudes as follows: −40, +52, +64, +52, −52, −64, −52, +32, −52, −64, −64, −64. A corresponding set of correlated symbols 426 is shown, each determined by multiplying (represented with symbol "X") a corresponding filtered symbol from the set of filtered symbols 422 with a corresponding SYNC value from the SYNC word 424 in a similar manner previously described. It is appreciated that the positive/negative pattern of the set of filtered symbols 422 is exactly the same as the SYNC word 424, so that both sets of values are perfectly correlated with each other. In this manner, the set of correlated symbols 426 are all positive values.

A maximum adjusted correlation value 428 is determined as the sum of the set of correlated symbols 426 having a sum value of +652. This is in contrast to a correlation value of 12*64=+768 for a corresponding set of 12 unfiltered symbols (each having an amplitude of 64). Since 100% correlation does not occur, the maximum adjusted correlation value 428 is multiplied by the correction factor 410 (same as before) to determine an adaptive correlation threshold 430. In the illustrated configuration, the correction factor 410 is selected as 75% or 0.75 resulting in an adaptive correlation threshold 430 value of 489. The adaptive correlation threshold 489 is also based on amplitude attenuation of the filtered symbols caused by the particular transitions of the SYNC word 424.

The deleterious effect of filtering on the signal, such as that shown in FIG. 3, causes amplitude attenuation of the corresponding digital symbols as shown by the sets of correlated symbols 406 and 426. This is true even with otherwise perfect correlation between the patterns of the SYNC words 404 and 424 and the filtered symbols 402 and 422, respectively. A comparison of the maximum adjusted correlation values 408 and 428 illustrate the impact of the different patterns of the SYNC words incorporated in the digital symbols of the received signal that correspond to the SYNC words 404 and 424. Since the SYNC word 424 has fewer transitions than the SYNC word 404, the amplitudes of the filtered symbols 422 following the pattern of the SYNC word 424 are greater than the corresponding amplitudes of the filtered symbols 402 following the pattern of the SYNC word 404. In this manner, the adaptive correlation threshold 412 having a value 384 is significantly less than the adaptive correlation threshold 430 having a value 489 even though both use the same correlation factor 410 (having a value of 0.75).

In general, for a given configuration with band pass and channel filtering, the level of amplitude attenuation of the signal and corresponding digital symbols can be empirically determined or otherwise estimated based on the "binary" pattern of the signal including the SYNC word. In this manner, the amount of amplitude attenuation may also be determined for each possible SYNC word that may be used for a wireless receiver. A SYNC word with a greater number of transitions results in a reduced correlation value as compared to a SYNC word with a reduced number of transitions. The SYNC word patterns may be mapped based on transition amount from greatest to least, and a correlation threshold can be determined for each SYNC word. A corresponding set of correlation thresholds can either be empirically determined and stored or may be estimated during operation.

Figure 5:
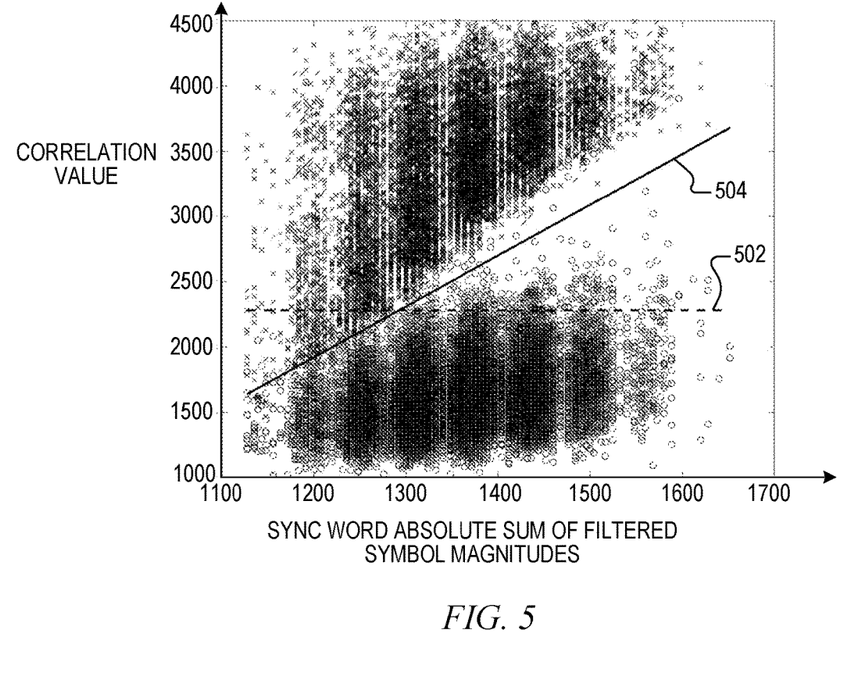
FIG. 5 is a scatter plot diagram plotting the correlation value versus the absolute sum of filtered symbol amplitudes for each applicable synchronization word that may be used for a particular wireless technology, such as the SYNC words that may be used in BLE.

FIG. 5 is a scatter plot diagram plotting the correlation value versus the absolute sum of filtered symbol amplitudes for each applicable SYNC word that may be used for a particular wireless technology, such as the SYNC words that may be used in Bluetooth Low Energy (Bluetooth LE or BLE). The lower SYNC word absolute sums (towards the left) represent SYNC words having a greater number of transitions, whereas the higher SYNC word absolute sums (towards the right) represent SYNC words having a lesser number of transitions. The "x" symbols represent true peak values whereas the "o" symbols represent false peak values. It is appreciated that there is a significant amount of overlap between the true and false peak values, particularly at the lower SYNC word absolute amplitudes.

A conventional fixed correlation threshold 502 is shown using a dashed line that attempts to distinguish between the true and false peak values. At the lower SYNC word absolute amplitudes, many of the true peak values fail and are thus rejected, whereas many of the false peak values pass at the higher SYNC word absolute amplitudes. The overall result is a significant reduction in efficiency in which a significant number of invalid packets are incorrectly accepted (and ultimately rejected), whereas a significant number of valid packets are incorrectly rejected resulting in undesired retransmission of valid packets.

An optimal correlation threshold 504 is shown using a solid line. The optimal correlation threshold 504 is adapted or otherwise varies based on the SYNC word and provides a more accurate distinction between the true and false peak values. Since the optimal correlation threshold 504 varies based on the SYNC word, a greater number of true peak values at the lower SYNC word absolute amplitudes pass, and a greater number of the false peak values fail at the higher SYNC word absolute amplitudes. The overall result is a significant increase in efficiency as compared to a conventional configuration in which most invalid packets are correctly rejected and most valid packets are correctly accepted.

Figure 6:
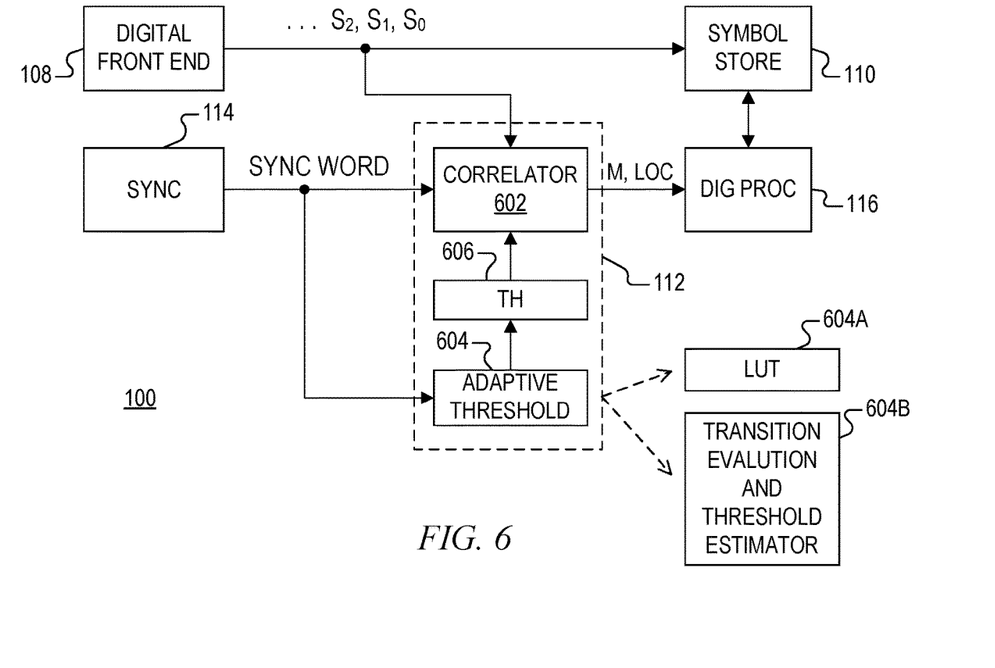
FIG. 6 is a simplified block diagram of a portion of the wireless receiver of FIG. 1 including further details of the correlation system of FIG. 1 using adaptive correlation threshold determination implemented according to one embodiment of the present invention.

FIG. 6 is a simplified block diagram of a portion of the wireless receiver 100 including further details of the correlation system 112 using adaptive correlation threshold determination implemented according to one embodiment of the present invention. The digital front end 108, the symbol store memory 110, the SYNC memory 114, and the digital processing circuitry 116 are included and operate in substantially similar manner as previously described. The correlation system 112 includes a correlator 602, an adaptive threshold circuit, and a threshold memory 606 for storing a correlation threshold value TH. The SYNC word is provided from the SYNC memory 114 to the correlator 602 and also to the adaptive threshold circuit. The adaptive threshold circuit retrieves or otherwise determines the corresponding correlation threshold TH based on the SYNC word, and stores TH in the threshold memory 606, in which the threshold memory 606 provides the correlation threshold TH to the correlator 602. In an alternative embodiment, the threshold memory 606 may be omitted in which the correlation threshold TH is provided directly from the adaptive threshold circuit to the correlator 602.

In operation, the SYNC word is provided by earlier communications (or other means) and stored into the SYNC memory 114 and provided to the correlator 602 and the adaptive threshold circuit. The adaptive threshold circuit provides a corresponding correlation threshold TH for storage in the threshold memory 606 or otherwise directly to the correlator 602. During wireless communications, the correlator 602 correlates the stream of symbols $S_0$, $S_1$, $S_2$, . . . , etc. with the SYNC word to identify whether a matching SYNC word exists within the received packet to determine whether to accept or reject the packet. When correlation passes, the correlator 602 asserts the match indication M and provides the LOC information to the digital processing circuitry 116, which accesses the payload information from the symbol store memory 110.

The configuration of the adaptive threshold circuit may depend upon the particular implementation. In one embodiment, the adaptive threshold circuit may be configured as a look-up table (LUT) 604A with previously stored correlation threshold values. In this case, the SYNC word from the SYNC memory 114 may be used as an index or the like for retrieving a corresponding correlation threshold TH from the LUT 604A. The stored correlation threshold values are previously determined either by prior calculation or by empirical means or the like. In an alternative embodiment, the adaptive threshold circuit may be configured as a transition evaluation and threshold estimator circuit 604B in which the correlation threshold TH is determined dynamically during operation. In this case, the correlation threshold TH is calculated based on the expected amplitudes based on transitions from symbol to symbol for the entire SYNC word. In either case, the correlation threshold values vary based on the SYNC word in a similar manner shown in FIG. 5 to form an optimal correlation threshold.

Figure 7:
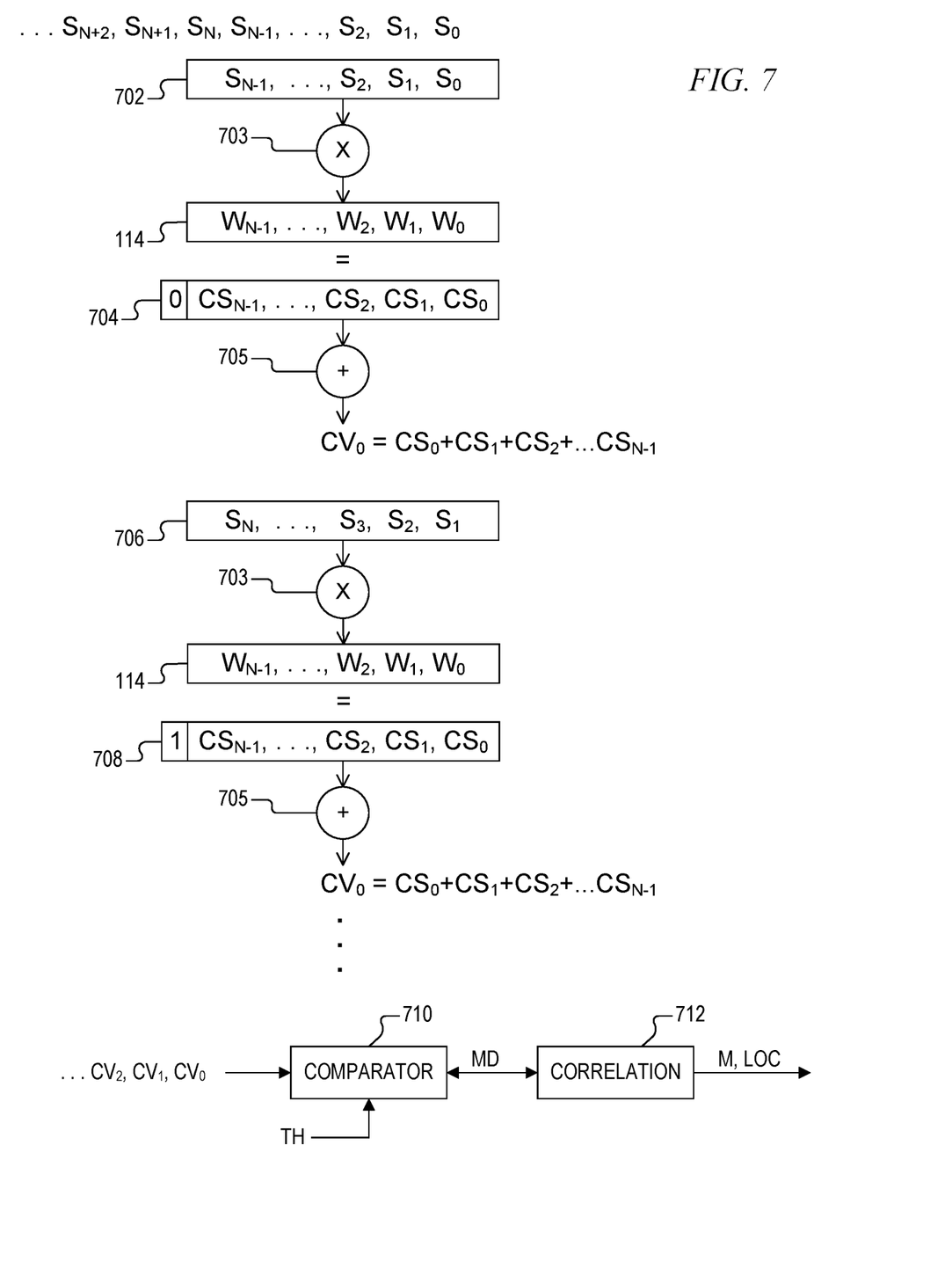
FIG. 7 is a figurative diagram illustrating the correlation process performed by the correlator of FIG. 6.

FIG. 7 is a figurative diagram illustrating the correlation process performed by the correlator 602. The series of digital symbols $S_j$, shown as $S_0$, $S_j$, $S_2$, $S_N$, $S_{N+1}$, $S_{N+2}$, . . . , oriented in the order received, are provided to the correlator 602 either directly or from the symbol store memory 110. The series of digital symbols $S_j$ are grouped N symbols at a time, in which "N" is the number of digital values contained with the applicable SYNC word. In one embodiment, for example, N=32, although alternative SYNC word sizes are contemplated. A first group 702 of digital symbols from $S_0$ to $S_{N-1}$ received by the correlator 602, and the corresponding digital values of the SYNC word stored in the SYNC memory 114, shown as $W_0$, $W_1$, $W_2$, . . . , $W_{N-1}$, are shown aligned with the first group 702 of digital symbols. A multiplier 703 provided in the correlator 602 multiplies each digital symbol $S_j$ in the order received with the corresponding SYNC word value $W_k$ of the SYNC word to provide a corresponding set of correlated symbols 704, in which "k" is an index value from 0 to N−1. The correlated symbols are calculated by the correlator 602 as follows: $CS_0=S_0*W_0$, $CS_j=S_j*W_1$, . . . , $CS_{N-1}=S_{N-1}*W_{N-1}$. Once each value of the set of correlated symbols 704 is determined, an adder 705 within the correlator 602 calculates a corresponding correlation value $CV_0$ as the sum of the correlation symbols of the set of correlated symbols 704, or $CV_0=CS_0+CS_1+CS_2+ \ldots +CS_{N-1}$.

The correlator 602 continues the correlation process with the next set of N digital symbols beginning with the second digital symbol $S_j$. It is appreciated that the groupings of the digital symbols for correlation overlap each other according to a sliding window function. Accordingly, a second group 706 of digital symbols from $S_j$ to $S_N$ and the corresponding digital values of the SYNC word $W_0$, $W_1$, $W_2$, . . . , $W_{N-1}$, are multiplied together in similar manner by the multiplier 703, symbol by symbol, to provide a corresponding second set of correlated symbols 708, which symbols are calculated by the correlator 602 as follows: $CS_0=S_j*W_0$, $CS_j=S_2*W_1$, . . . , $CS_{N-1}=S_N*W_{N-1}$. Once each value of the second set of correlated symbols 708 is determined, the adder 705 sums the individual correlated symbols 708 together to calculate the next correlation value $CV_1$ in a similar manner as described for the set of correlated symbols 704.

In the general sense, the correlation process is performed based on a sliding window of N values of the digital symbols $S_j$ at a time. The first correlation value is determined based on the first N digital symbols beginning with the first digital symbol, the second correlation value is determined based on the next N digital symbols beginning with the second digital symbol, and so on according to the sliding window function. As each correlation value $CV_0$, $CV_1$, $CV_2$, . . . , etc., is calculated, it is compared with the correlation threshold TH by a comparator 710 within the correlator 602. When at least one correlation value reaches the threshold, a match detect signal MD is asserted to a correlation circuit 712. The correlation circuit 712 performs additional processing to qualify the correlation and eventually provides the match indication M and the location information LOC when a match is determined. For example, a single matching value may be a false positive, so that additional correlation values may be evaluated to identify a maximum correlation value, and each correlation match may further be qualified as further described herein.

Figure 8:
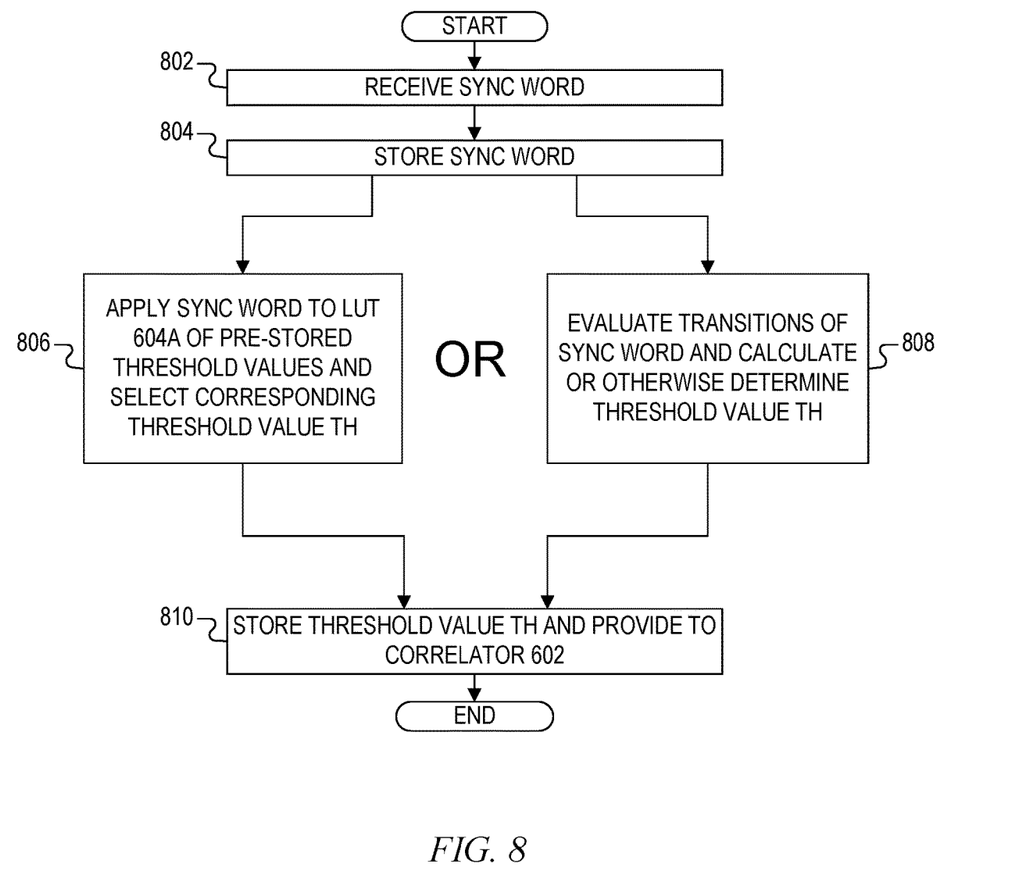
FIG. 8 is a flowchart diagram illustrating a process performed by the wireless receiver of FIG. 1 for acquiring the synchronization word.

FIG. 8 is a flowchart diagram illustrating a process performed by the wireless receiver 100 for acquiring the SYNC word. At first block 802, the SYNC word is received. The SYNC word may be provided by an external source, or the SYNC word may be determined internally or by other means depending upon the applicable communication protocol. In one embodiment, for example, the wireless receiver 100 may perform a communication session with an external host device or the like in a local wireless network to retrieve the SYNC word. Once received, at next block 804 the SYNC word is stored, such as into the SYNC memory 114. Operation then proceeds to either block 806 or block 808 depending upon the implementation of the adaptive threshold circuit. When the adaptive threshold circuit is configured as the LUT 604A, then at block 806 the received SYNC word is applied to the LUT 604A of pre-stored threshold values and the corresponding threshold value TH is retrieved and provided by the LUT 604A. When the adaptive threshold circuit is configured as the transition evaluation and threshold estimator circuit 604B, then at block 808 the received SYNC word is provided to the transition evaluation and threshold estimator circuit 604B which evaluates transitions of the SYNC word and corresponding amplitudes to calculate or otherwise determine the threshold value TH. As previously described, TH is based on the relative number or relative frequency of transitions of the SYNC word and expected amplitudes for the transitions. Once TH is determined, operation advances to block 810 in which the correlation threshold TH is stored, such as in the threshold memory 606, and provided to the correlator 602.

Figure 9:
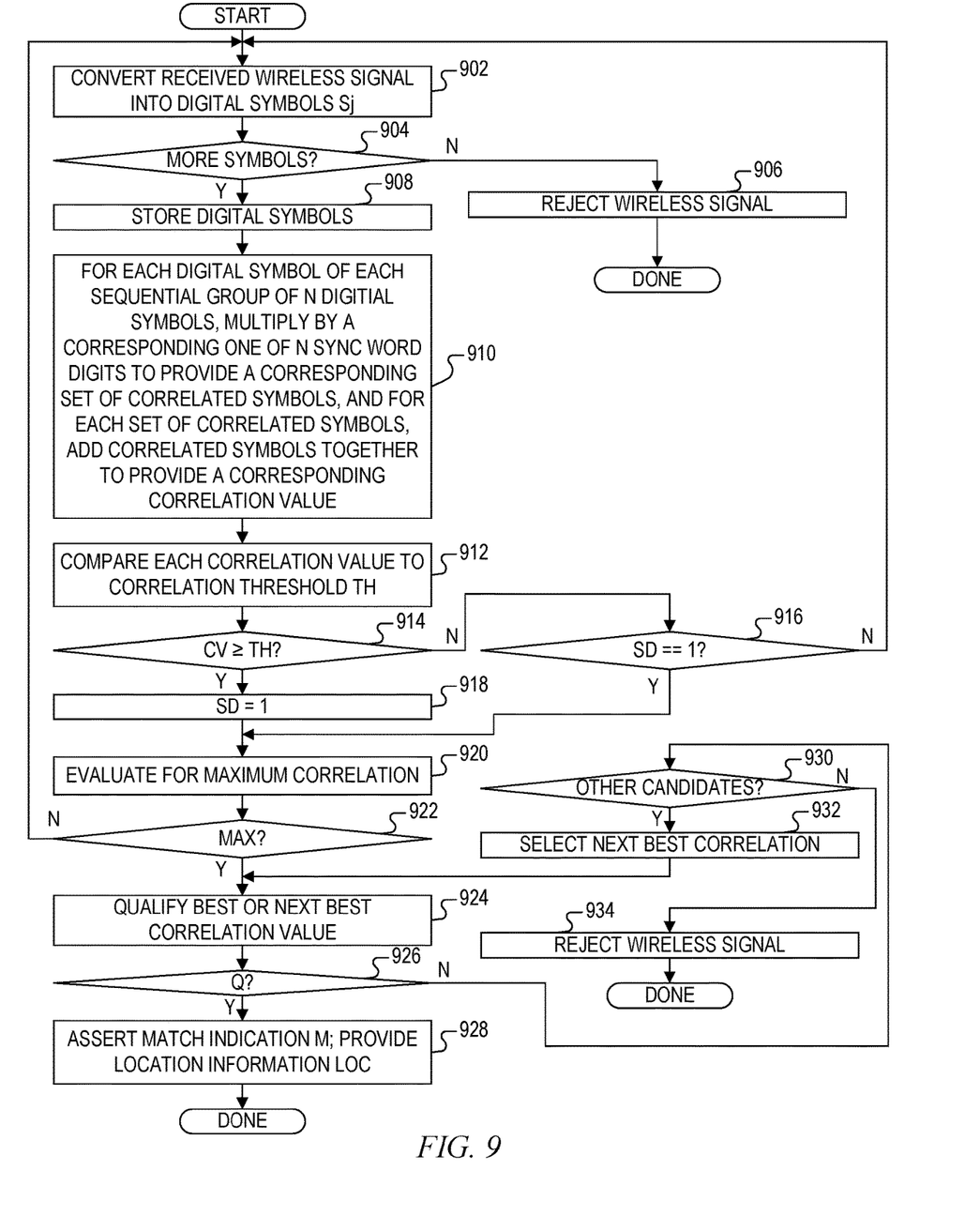
FIG. 9 is a flowchart diagram illustrating operation of the wireless device of FIG. 1 configured as shown in FIG. 6 when receiving a wireless signal and performing the correlation process.

FIG. 9 is a flowchart diagram illustrating operation of the wireless device 100 when receiving a wireless signal and performing the correlation process. At first block 902, the wireless device 100 converts a received wireless signal into the series of digital symbols Sj as previously described. At next block 904, it is queried whether more symbols are available. If correlation fails, or if the signal terminates early for any reason, then operation proceeds to block 906 in which the wireless signal is rejected and operation is completed. If, however, there are more symbols, then operation proceeds instead to block 908 in which the digital symbols are stored, such as in the symbol store memory 110.

At next block 910, the correlation process is initiated similar to that described in FIG. 7. For each digital symbol of each sequential group of N digital symbols, the digital symbol is multiplied by a corresponding one of the N SYNC values or digits of the SYNC word to provide a corresponding set of correlated symbols. As previously noted, each digital symbol $S_j$ begins the next sequential group N digital symbols according to the sliding window function. Then, the individual digital symbols of each set of correlated symbols are added together to provide a corresponding correlation value. At next block 912, each correlation value is compared to the adaptive correlation threshold TH, such as performed by the comparator 710 previously described. If the next correlation value CV is greater than or equal to TH as determined at query block 914, then operation proceeds to block 918 in which a SYNC detect signal SD is set equal to 1, or SD=1. It is noted that the SYNC detect signal SD is distinguished from the match detect signal MD. The MD signal is set each time a correlation match occurred and then reset for the next correlation value of the wireless signal. SD is set once upon the first occurrence of MD, and then remains set for the remainder of the wireless signal until completed before being reset.

If instead the next correlation value CV is less than TH as determined at query block 914, then operation proceeds to a block 916 in which the SD signal is evaluated to determine whether a prior match occurred (e.g., SD==1?). If SD was not previously set to 1, then operation returns to block 902 for continued evaluation of the wireless signal is being received. If SD is set to 1 at block 918, or if SD was previously set to 1 as determined at block 916, operation proceeds to block 920 to perform a maximum correlation evaluation process. It is noted that for any wireless signal, multiple matching correlations may be possible which may include one or more false positives. In one embodiment, after a match is found, a certain number of additional correlation values are evaluated to determine whether a stronger correlation is found. The maximum one of multiple correlation values may be determined as the matching correlation. At next block 922 if the maximum correlation has not been found or if additional correlation values are to be evaluated, then MAX is false and operation returns to block 902 for continued processing of the wireless signal.

If MAX is true as determined at block 922 indicating that a match is found or the strongest correlation has been determined, then operation proceeds to block 924 in which the correlation value is further qualified. The qualification process examines the individual correlated symbols to determine whether there are any identifiable errors in the correlation. In one embodiment, a single correlation error may be tolerated, whereas multiple correlation errors may lead to rejection of the wireless signal. If the match is qualified as determined at next block 926 in which a qualification factor Q is true, then the correlator 602 asserts the match indication M and provides the location information LOC at next block 928 and operation is completed.

If for any reason the best matching correlation fails such that Q is false as determined at block 926, then operation proceeds instead to block 930 to determine whether other matching correlations may be considered as candidates for qualification. For example, if multiple correlations meet or exceed the correlation threshold TH and the highest correlation value fails qualification, then the next best correlation value may be considered for qualification. If so, operation proceeds to block 932 in which the next best correlation value is selected, and then back to block 924 to qualify the next best correlation value. Operation may loop between blocks 924 and 932 for qualifying multiple possible correlation candidates. If none of the correlation value candidates pass qualification as determined at block 930, then operation proceeds instead to block 934 in which the wireless signal is rejected and operation is completed.

The present description has been presented to enable one of ordinary skill in the art to make and use the present invention as provided within the context of particular applications and corresponding requirements. The present invention is not intended, however, to be limited to the particular embodiments shown and described herein, but is to be accorded the widest scope consistent with the principles and novel features herein disclosed. Many other versions and variations are possible and contemplated. Those skilled in the art should appreciate that they can readily use the disclosed conception and specific embodiments as a basis for designing or modifying other structures for providing the same purposes of the present invention without departing from the spirit and scope of the invention.

The invention claimed is:
1. A wireless receiver, comprising:
an adaptive threshold circuit that determines an adaptive correlation threshold using a selected sync word based on a predetermined mapping between a plurality of different sync words and a corresponding plurality of correlation thresholds;
a front end circuit that converts a wireless signal into a plurality of digital symbols; and
a correlator that correlates said plurality of digital symbols with said sync word using said adaptive correlation threshold.

2. The wireless receiver of claim 1, wherein said adaptive threshold circuit determines said adaptive correlation threshold based on amplitude attenuation of said plurality of digital symbols that correspond to transitions of said sync word as a result of filtering by said front end circuit.

3. The wireless receiver of claim 1, wherein said adaptive threshold circuit comprises a lookup table that stores said plurality of correlation thresholds each corresponding to one of said plurality of different sync words, and wherein said sync word is used to select one of said plurality of correlation thresholds as said adaptive correlation threshold.

4. The wireless receiver of claim 1, wherein said adaptive threshold circuit comprises an evaluation circuit that determines said adaptive correlation threshold based on expected amplitude attenuation of said plurality of digital symbols that correspond to transitions of said sync word.

5. The wireless receiver of claim 1, wherein said sync word comprises N digital values, and wherein said correlator comprises:
a multiplier that multiplies each digital symbol of each group of N sequential symbols of said plurality of digital symbols with a corresponding one of said N digital values to provide a plurality of sets of N correlated symbols;
an adder that sums said N correlated symbols of each group together to provide a corresponding one of a plurality of correlation values; and
a comparator that compares each of said plurality of correlation values with said adaptive correlation threshold.

6. The wireless receiver of claim 5, wherein said each group of N sequential symbols is determined beginning with each digital symbol and the following N−1 sequential digital symbols according to a sliding window function.

7. The wireless receiver of claim 5, further comprising:
a memory that stores said plurality of digital symbols in sequential manner; and
wherein when at least one of said plurality of correlation values reaches said adaptive correlation threshold, said correlator provides location information that locates at least one of said plurality of digital symbols stored in said memory.

8. A method of adaptive correlation, comprising:
determining an adaptive correlation threshold that corresponds to using a selected sync word based on a predetermined mapping between a plurality of different sync words and a corresponding plurality of correlation thresholds;
converting a wireless signal into a plurality of digital symbols; and
correlating the plurality of digital symbols with the sync word using the adaptive correlation threshold.

9. The method of claim 8, wherein said determining an adaptive correlation threshold comprises determining the adaptive correlation threshold based on amplitude attenuation of the plurality of digital symbols that correspond to transitions of the sync word as a result of filtering during said converting.

10. The method of claim 8, wherein said determining an adaptive correlation threshold comprises:
applying the sync word to a lookup table that stores the plurality of correlation thresholds each corresponding to one of a plurality of different sync words; and
receiving from the lookup table one of the plurality of correlation thresholds that corresponds with the applied sync word as the adaptive correlation threshold.

11. The method of claim 8, wherein said determining an adaptive correlation threshold comprises:
determining expected amplitude attenuation of digital symbols based on transitions of the sync word and providing a plurality of attenuated amplitudes;
summing the plurality of attenuated amplitudes to determine a maximum adjusted correlation value; and
calculating the adaptive correlation threshold by multiplying the maximum adjusted correlation value by a correction factor.

12. The method of claim 8, wherein the sync word comprises N digital values, and wherein said correlating comprises:
multiplying each symbol of each group of N sequential symbols of the plurality of digital symbols with a corresponding one of the N digital values of the sync word to provide a plurality of sets of N correlated symbols;
summing the N correlated symbols of each group together to provide a corresponding one of a plurality of correlation values; and
comparing each of the plurality of correlation values with the adaptive correlation threshold.

13. The method of claim 12, further comprising determining each group of N sequential symbols to begin with each digital symbol and to include the following N−1 sequential digital symbols according to a sliding window function.

14. The method of claim 12, further comprising:
storing the plurality of digital symbols in sequential manner; and
when at least one of the plurality of correlation values reaches the adaptive correlation threshold, providing location information that locates at least one of the plurality of stored digital symbols.

15. A correlation system, comprising:
a memory that stores a selected sync word;
an adaptive threshold circuit that uses said sync word to determine an adaptive correlation threshold based on a predetermined mapping between a plurality of different sync words and a corresponding plurality of correlation thresholds; and
a correlator that correlates a plurality of digital symbols converted from a bandlimited signal with said sync word using said adaptive correlation threshold.

16. The correlation system of claim 15, wherein said adaptive threshold circuit determines said adaptive correlation threshold based on amplitude attenuation of said plurality of digital symbols that correspond to transitions of said sync word as a result of filtering.

17. The correlation system of claim 15, wherein said adaptive threshold circuit comprises a lookup table that stores said plurality of correlation thresholds, and wherein said sync word is used to select one of said plurality of correlation thresholds as said adaptive correlation threshold.

18. The correlation system of claim 15, wherein said adaptive threshold circuit comprises an evaluation circuit that determines said adaptive correlation threshold based on an expected amount of amplitude attenuation of said plurality of digital symbols that correspond to transitions of the sync word.

19. The correlation system of claim 15, wherein said sync word comprises N digital values, and wherein said correlator comprises:
- a multiplier that multiplies each digital symbol of each group of N sequential symbols of said plurality of digital symbols with a corresponding one of said N digital values to provide a plurality of sets of N correlated symbol;
- an adder that sums said N correlated symbols of each group together to provide a corresponding one of a plurality of correlation values; and
- a comparator that compares each of said plurality of correlation values with said adaptive correlation threshold.

20. The correlation system of claim 19, wherein said each group of N sequential symbols is determined beginning with each digital symbol and the following N−1 sequential digital symbols according to a sliding window function.

\* \* \* \* \*